United States Patent [19]
Tung et al.

[11] Patent Number: 5,361,818
[45] Date of Patent: Nov. 8, 1994

[54] POLYESTER/POLYEPOXIDE/RUBBER ALLOYS

[75] Inventors: Deborah A. Tung, Tallmadge, Ohio; Thomas J. Segatta, Lawton, Okla.; John J. A. Verthe, Kent, Ohio; Paul H. Sandstrom, Tallmadge, Ohio; Richard G. Bauer, Kent, Ohio; Mark A. Marinko, Stow, Ohio

[73] Assignee: The Goodyear Tire & Rubber Company, Akron, Ohio

[21] Appl. No.: 126,866

[22] Filed: Sep. 27, 1993

[51] Int. Cl.$^5$ .......................... B60C 1/00; C08L 7/00; C08L 9/00
[52] U.S. Cl. ..................... 152/525; 525/111; 525/177
[58] Field of Search ............... 525/111, 177; 152/525

[56] References Cited

U.S. PATENT DOCUMENTS 5,166,267  11/1992  Cohn .................... 525/177

FOREIGN PATENT DOCUMENTS 0337976  10/1989  European Pat. Off. .
0389797  10/1990  European Pat. Off. ............ 525/166
1208585  10/1970  United Kingdom .

Primary Examiner—Patricia A. Short
Attorney, Agent, or Firm—Bruce J. Hendricks

[57] ABSTRACT

The present invention relates to polymeric alloys which comprise the reaction product of a mixture of:
  (a) a polyester resin produced from the precondensation reaction of a diol and a dicarboxylic compound, said polyester subsequently condensed and having an intrinsic viscosity from about 0.13 to about 0.35 dl/g, a glass transition temperature of at least 50° C., an acid number from about 5 to 50;
  (b) at least one polyepoxide having at least two epoxy groups per molecule; and
  (c) an unvulcanized rubber.

11 Claims, No Drawings

5,361,818

POLYESTER/POLYEPOXIDE/RUBBER ALLOYS

BACKGROUND OF THE INVENTION

It is sometimes desirable to increase the modulus of rubber compounds. For instance, it is generally desirable to increase the modulus of rubber compounds which are utilized in tire tread base compositions and in tire wire coat compounds. A higher degree of stiffness in such rubber compositions is conventionally attained by incorporating larger amounts of fillers, such as carbon black, into the rubber compounds and/or by increasing the state of cure of such compounds. Unfortunately, both of these techniques lead to undesirable results. For instance, the incorporation of additional carbon black into rubber compounds typically leads to high levels of hysteresis. Accordingly, the utilization of such compounds in tires results in excessive heat build-up and poor cut growth characteristics. The utilization of high amounts of sulfur to attain a high state of cure typically leads to poor aging resistance. Furthermore, it is highly impractical to reach high levels of stiffness by increased state of cure alone. For these reasons, it is not possible to attain the desired degree of stiffness in rubber compounds by simply adding higher levels of fillers or curatives.

SUMMARY OF THE INVENTION

The present invention relates to novel alloys derived from a polyester, polyepoxide and unvulcanized rubber. These alloys are particularly useful in the preparation of rubber vulcanizates.

DETAILED DESCRIPTION OF THE INVENTION

There is disclosed a composition which comprises the reaction product of a mixture of:

(a) a polyester resin produced from the precondensation reaction of a diol and a dicarboxylic compound, said polyester subsequently condensed and having an intrinsic viscosity from about 0.13 to about 0.35 dl/g, a glass transition temperature of at least 50° C. and an acid number from about 5 to 50;

(b) at least one polyepoxide having at least two epoxy groups per molecule; and (c) an unvulcanized rubber.

There is also disclosed a rubber stock comprising a blend of:

(a) a polymer alloy which is the reaction product of a mixture of:

(1) a polyester resin produced from the polycondensation reaction of a diol and a dicarboxylic compound, said polyester subsequently condensed and having an intrinsic viscosity from about 0.13 to about 0.35 dl/g, a glass transition temperature of at least 50° C. and an acid number from about 5 to 50;

(2) at least one polyepoxide having at least two epoxy groups per molecule; and (3) an unvulcanized rubber; and (b) an unvulcanized rubber selected from the group consisting of natural rubber and synthetic rubber derived from a diene monomer wherein the amount of polymer alloy is present in the blend in an amount that the total weight of the polyester and polyepoxide ranges from about 2 to 25 parts by weight per 100 parts by weight of the total rubber in the stock.

The polyester which may be used in the present invention is known to those skilled in the art. The polyester may be derived from one diol and one dicarboxylic acid compound or may be derived from two or more diols and one dicarboxylic acid compound or a diol and two or more dicarboxylic compounds. In addition, the polyester may be a copolyester derived from a diol, a dicarboxylic compound and a chain branching agent. One such copolyester is described in U.S. Pat. No. 4,264,751, which is incorporated by reference in its entirety. Such copolyester resins are prepared in three stages: an esterification stage, a condensation stage, and a finishing stage. The preparation of the polyester prepolymer occurs in the esterification stage by the reaction of a diol, a dicarboxylic compound, and a chain branching agent if used. The polyester prepolymer is polycondensed in a condensation stage to produce a polyester resin having an intrinsic viscosity from about 0.13 to about 0.35 dl/g and preferably from about 0.19 to about 0.21 dl/g.

The dicarboxylic compound may be either a dicarboxylic acid or a dicarboxylic ester. The dicarboxylic acids may be an alkyl dicarboxylic acid having a total of from 2 to 16 carbon atoms, or an aryl dicarboxylic acid having a total of from 8 to 16 carbon atoms. Specific examples of alkyl dicarboxylic acids are oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as paraphthalic (terephthalic) acid and naphthalic acid. Specific examples of alkyl substituted aryl acids include the various isomers of dimethylphthalic acid, such as dimethylisophthalic acid, dimethylorthophthalic acid, and dimethylterephthalic acid; the various isomers of diethylphthalic acid, such as diethylisophthalic acid, diethylorthophthalic acid, and diethylterephthalic acid; the various isomers of dimethylnaphthalic acid, such as 2,6-dimethylnaphthalic acid an 2,5-dimethylnaphthalic acid; and the various isomers of diethylnaphthalic acid. Generally, dimethylterephthalic acid and terephthalic acid are the preferred dicarboxylic acids.

In lieu of the various dicarboxylic acids, the various diesters thereof may be utilized. Thus, the dicarboxylic compound may be an alkyl diester containing a total of from about 2 to 20 carbon atoms, as well as the alkyl substituted aryl diesters containing from about 10 to about 20 carbon atoms. Examples of specific alkyl diesters including dimethyl adipate, and the like. Specific examples of the various alkyl substituted aryl diesters include the various isomers of dimethylphthalate, the various isomers of diethylphthalate, the various isomers of dimethylnaphthalate, and the various isomers of diethylnaphthalate. Of the dicarboxylic diesters, preferably, the various isomers of dimethylphthalate (dimethylterephthalate) are used. Of the dicarboxylic compounds, the various isomers of dimethylterephthalate are most preferred.

These carboxylic acids or the diesters thereof react in the esterification stage with a diol containing from about 2 to 10 carbon atoms. The glycols may be straight-chained or branched. Specific examples include ethylene glycol, propylene glycol, trimethylene glycol, 1,2-butane diol, 1,3-butane diol, 1,4-butane diol, b 2,3-butane diol, neopentyl glycol, hexamethylene glycol, cyclohexane dimethanol, and the ester diol product of neopentyl glycol and hydropavalic acid (propanoic acid, 3-hydroxy-2,2-dimethyl-3 hydroxy-2,2 dimethyl propyl ester). Of the various diols, neopentyl glycol is most preferred. The diol is added to the esterification stage in the reactant charging step in a concentration in comparison to the dicarboxylic compound in a mold ratio from about 2.20 to about 1.15:1. Preferably, the mole ratio is from about 1.7 to about 1.5:1.

The chain branching agent may be used to prepare the copolyester. A chain branching agent is a compound having at least a functionality of three to incorporate within the chain of the polyester prepolymer and retain a branch reactive site. Chain branching agents having at least a trifunctionality include trimellitic anhydride, pentaerythritol, glycerol, trimethylol propane, triethylol propane, and other multi-functional alcohols. The chain branching agent may be reacted in the esterification stage in a concentration in comparison with the concentration of the dicarboxylic compound in a mole ratio less than about 0.10:1. Desirably, the chain branching agent has a concentration from about 2 to 8 mole percent, comparative to the concentration of the dicarboxylic compound.

The esterification stage comprises a reactant charging step and optionally a chain branching agent addition step. The optional chain branching agent addition step occurs simultaneously with the reactant charging step when the chain branching agent is a multifunctional alcohol such as trimethylol propane, triethylol propane, pentaerythritol, and glycerol. The reactant charging step precedes the chain branching agent addition step when trimellitic anhydride is the chain branching agent. In such later case, the chain branching addition step proceeds after at least 90 percent of the dicarboxylic compound and diol have completed methanolysis. Whereas the esterification stage proceeds uninterrupted or undelayed when the chain branching agent is one of the multi-functional alcohols, an additional 20 minutes is required in the esterification stage before the condensation stage when the trimellitic anhydride is the chain branching agent.

In the esterification stage, various catalysts may be used. Examples of these catalysts include dibutyltin oxide sodium acetate, stannous octoate, butyl hydroxytin chloride, zinc acetate, and titanium glycolate.

Curing agents suitable for the hydroxyl terminated end groups may be used. Representative examples include a caprolactam-blocked isophorone diisocyanate such as Cargill CR2400 and a melamine such as American Cyanamid Cymel 300.

The copolyester may have a Tg range at least from 50° C. to about 80° C. The acid numbers for the copolyester may range from about 5 to about 50 and preferably 20 to about 40.

The polyepoxides which are useful in preparing the compositions of the invention contain at least two epoxy groups per molecule and the molecule may contain saturated or unsaturated groups, aliphatic, cycloaliphatic, aromatic or heterocyclic structures and may be substituted with non-interfering substituents such as ester groups, ether groups, and the like. Polyepoxides containing ether groups, generally designated as polyepoxide polyethers, may be prepared as well known in the art.

Illustrative examples of polyepoxide polyethers are as follows: 1,4-bis(2,3-epoxypropoxy)benzene; 1,3-bis(2,3-epoxypropoxy)benzene; 4,4'-bis(2,3-epoxypropoxy)-diphenyl ether; 1,8-bis(2,3-epoxypropoxy)octane; 1,4-bis (2,3-epoxypropoxy)-cyclohexane; 1,3-bis(4,5-epoxypentoxy)-5-chlorobenzene; 1,4-bis(3,4-epoxybutoxy)-2-chlorohexane; diglycidyl thioether; diglycidyl ether; ethylene glycol diglycidyl ether; propylene glycol diglycidyl ether; 1,4-butanediol diglycidyl ether; diethylene glycol diglycidyl ether; 1,2,3,4-tetrakis(2-hydroxy-3,4-epoxybutoxy)butane; 2,2-bis[para(2,3-epoxypropoxyphenyl)]propane; glycerol triglycidyl ether; pentaerythritol tetraglycidyl ether; sorbitol tetraglycidyl ether; glycerol diglycidyl ether; etc. The polyepoxide polyethers may or may not contain hydroxy groups, depending primarily on the method of preparation, and the amount can be varied by methods well known in the art.

Polyepoxides which do not contain ether groups may be employed as for example 1,2,5,6-diepoxyhexane; butadiene dioxide (that is 1,2,3,4-diepoxybutane); isoprene dioxide; limonene dioxide, and cyclic polyepoxides having the formulae:

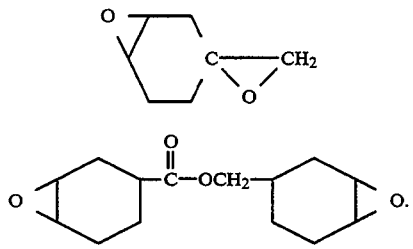

In general, the polyepoxide polyethers are preferred and, more particularly, the polyepoxide polyethers of the class of glycidyl polyethers of polyhydric alcohols or polyhydric phenols. These compounds may be considered as being derived from a polyhydric alcohol or polyhydric phenol by etherification with at least two glycidyl groups:

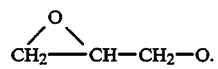

The alcohol or phenol moiety may be completely etherified or may contain residual hydroxy groups. Typical examples of compounds in this category are the glycidyl polyethers of ethylene glycol, glycerol, 1,4-butanediol, diethylene glycol, 2,2-bis(parahydroxyphenyl)propane, or any of the other polyols listed hereinabove as useful for preparation of glycidyl ethers. Particularly, preferred among the glycidyl polyethers are those derived from 2,2-bis(parahydroxyphenyl)propane (hereinafter designated as DGEBA):

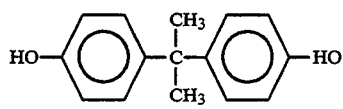

and those derived from ethylene glycol or 1,4-butanediol (hereinafter designated as DGEBD). The commercially available compounds derived from the first-named of these polyols have molecular weights of from about 350 to 8,000. Of this class of polyepoxides, it is preferred to employ the lower molecular weight compounds.

Epoxides of the types described above and useful in this invention are available from a wide variety of commercial sources.

The polyepoxides are conventionally termed as epoxy resins even though the compounds are not technically resins in the state in which they are sold and employed because they are of relatively low molecular weight and do not have resinous properties as such. One groups is known by the general trade designation "Epon" resins, and these are available from the Shell Chemical Company. For example, "Epon 820" is an epoxy resin having an average molecular weight of about 380 and is prepared from 2,2-bis(p-hydroxyphenyl)propane and epichlorohydrin. Similarly, "Epon 1031" is an epoxy resin having an average molecular weight of about 616 and is prepared from epichlorohydrin and symmetrical tetrakis(p-hydroxyphenyl)ethane. "Epon 828" has a molecular weight of 350–400, an epoxide equivalent of about 173–210, and is prepared by etherification of 2,2-bis(p-hydroxyphenyl)propane with at least two glycidyl groups. This latter polyepoxide also is referred to in the art as a diglycidyl ether of "Bisphenol A". Another diglycidyl ether of "Bisphenol A" is commercially available from Dow Chemical under the designation DER 331 having an epoxide equivalent weight of 188. Another polyepoxide which may be used is a 1,3,5-triglycidyl isocyanurate commercially available from Ciba Geigy under the designation PT810-araldite and having a molecular weight of 800, melting point of 100° C. and an epoxide eq. weight of 106. Another polyepoxide is an epoxy novolar resin commercially available from Dow Chemical under the designation DOW DEN 438 having a molecular weight of 640 and an epoxy equivalent weight of 180.

The unvulcanized rubber in admixture with the polyester and polyepoxide to form the polymer alloy may vary. The unvulcanized rubber is natural rubber and/or typically contains repeat units which are derived from diene monomers, such as conjugated diene monomers and/or nonconjugated diene monomers. Such conjugated and nonconjugated diene monomers typically contain from 4 to about 8 carbon atoms. Some representative examples of suitable diene monomers include 1,3-butadiene, isoprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene and the like. The polydiene rubber can also contain various vinyl aromatic monomers, such as styrene, 1-vinylnaphthalate, 2-vinylnaphthalene, α-methylstyrene, 4-phenylstyrene, 3-methylstyrene, and the like. Some representative examples of diene rubbers that can be used to prepare the alloy include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber and EPDM rubber. The preferred rubbers are natural rubber and synthetic polyisoprene.

The respective weight percentages of each of the three components in the polymer alloy may vary. Generally speaking, the level of polyester ranges from about 10 to 30 parts by weight, the level of polyepoxide ranges from about 1 to 6 parts by weight, and the level of unvulcanized rubber ranges from about 50 to 150 parts by weight. Preferably, the polyester ranges from about 15 to 25 parts by weight, the polyepoxide ranges from 1 to 5 parts by weight, and the unvulcanized rubber ranges from 75 to 125 parts by weight.

The polyester, polyepoxide and unvulcanized rubber are mixed together in a solid state. The compositions of the present invention are prepared by simply mixing the polyepoxide with the polyester and the unvulcanized rubber. This can be accomplished by simply mixing the polyester with the unvulcanized rubber to form a homogeneous blend and thereafter adding the polyepoxide. The carboxyl groups on the polyester are believed to react with the epoxy groups and cause chain entanglement within the rubber matrix. Preferably, the rubber is fluxed, the polyepoxide is added and mixed with the polyester and catalyst thereafter added. The mixing of the polyester polyepoxide and rubber will typically be carried out at a temperature ranging from about 145° C. to 190° C. It is preferred to conduct the mixing at a temperature ranging from about 155° C. to 175° C.

The mixing of the components may be conducted in conventional equipment and procedures. For example, the mixing may be carried out in a Banbury mixer, mill mixer or extruder.

During the solid state mixing of the polyester, polyepoxide and rubber, one may add a catalyst. Representative catalysts include quaternary ammonium salts, lithium salts and dibutyltin oxide. A suitable quaternary ammonium salt is benzyl trimethylammonium chloride.

In one aspect of the present invention, conventional amounts of an antidegradant are added to the polymer alloy in order to protect the diene rubber during processing. The antidegradant may be selected from any of a number of commercially available antidegradants including monophenols, bisphenols, thiobisphenols, polyphenols, hydroquinone derivatives, phosphites and blends thereof, thioesters, naphthylamines, diphenylamines, para-phenylenediamines, quinolines and the like. Generally speaking, these antidegradants are used in an amount ranging from about 0.1 phr to about 10 phr. Preferably a combination of para-phenylenediamine type and monophenolic type antioxidant is used in an amount ranging from about 0.25 phr each to about 0.75 phr each.

The polymer alloy, containing the polyester polyepoxide and rubber, may be added to an unvulcanized rubber to form a rubber stock or blend. The amount of polymer alloy is generally present in the blend in an amount that the total weight of the polyester and polyepoxide ranges from about 2 to 25 parts by weight per 100 parts by weight of the total rubber in the blend or stock. Preferably, the amount of polymer alloy is present in the blend or stock. Preferably, the amount of polymer alloy is present in the blend in an amount that the total weight of the polyester and polyepoxide ranges from about 5 to 15 parts by weight per 100 parts by weight of total rubber in the blend.

The unvulcanized rubber to which the alloy is combined is predominantly natural rubber or a synthetic rubber derived from a diene monomer. Suitable examples of such rubbers or blends thereof are the same or listed for use in the polymer alloy. The rubber can, however, be a different type of rubber than used in the polymer alloy. In a particularly preferred mode, the same type of rubber in the alloy is the same type of rubber to which the alloy is combined to form the blend.

In addition to the unvulcanized rubber and polymer alloy, the rubber stock may contain conventional additives including fillers, pigments, zinc oxide, stearic acid, accelerators, sulfur vulcanizing agents, stabilizers, antidegradants, processing oils, tackifiers, plasticizers, waxes, prevulcanization inhibitors, extender oils and the like. Representative of suitable fillers including carbon black, silica, titanium dioxide and clay which are typically added in amounts ranging from 25 to about 125 phr depending on the application of the stock. Representative of conventional accelerators are amines, guanidines, thioureas, thiazoles, thiurams, sulfenamides, dithiocarbamates and xanthates which are typically added in amounts of from about 0.2 to about 5 phr. Representative of sulfur vulcanizing agents include element sulfur (free sulfur) or sulfur donating vulcanizing agents, for example, an amine disulfide, polymeric polysulfide or sulfur olein adducts. The amount of the sulfur vulcanizing agent will vary depending on the type of rubber and particular type of sulfur vulcanizing agent but generally range from about 0.1 phr to about 5 phr with a range of from about 0.5 to about 2 being preferred. Representative of the antidegradants which may be in the rubber stock include monophenols, bisphenols, thiobisphenols, polyphenols, hydroquinone derivatives, phosphites, phosphate blends, thioesters, napthylamines, diphenylamines as well as other diarylamine derivatives, paraphenylenediamines, quinolines and blended amines. Antidegradants are generally used in an amount ranging from about 0.10 phr to about 10 phr. Representative of processing oils which may be used in the rubber stock include activated dithio-bisbenzanilide, poly-para-dinitrosobenzene, xylyl mercaptans, aliphatic-naphthenic-aromatic resins, polyethylene glycol, petroleum oils, ester plasticizers, vulcanized vegetable oils, pine tar, phenolic resins, petroleum resins, polymeric esters and rosins. These processing oils may be used in conventional amounts ranging from about 0 to about 30 phr.

The blend of rubber stock and polymer alloy may be used to form a number of composites including tires, belts or hoses. Preferably, the composite is a tire.

As known to those skilled in the art, a tire is a composite of several components, each serving a specific and unique function yet all synergistically functioning to produce the desires performance. Tire components are made from rubber stocks and cords (textile, fiberglass, and steel wire). It is in the rubber stock containing the alloy of the present invention that is of particular importance. The components of a tire that the alloy may be used include the tread base, tread cap, carcass ply, cushion, belt ply, shoulder wedge, bead area, apex and chafer. Of particular interest is where the component containing the alloy interfaces a polyester fabric or cord, such as in the carcass ply of a tire.

EXAMPLE 1

The copolyester used in this example was purchased from Shell Chemical Company under the commercial designation H4541 Vitel. The copolyester was derived from neopentyl glycol, ethylene glycol, dimethyl terephthalate, dimethyl isophthalate and dimethyl adipate with trimethylol propane as the branching agent. The IV of the copolyester was 0.18. The acid number of the copolyester was 35 and the glass transition temperature was 62° C. Twenty parts by weight of the copolyester was used in each sample.

Three polyepoxides were evaluated. The first polyepoxide was Araldite PT810. The second was bow DEN 438. The third was bow DER 331. Three parts by weight of polyepoxide were used in each sample.

The unvulcanized rubber was synthetic cis-polyisoprene commercially available from The Goodyear Tire & Rubber Company under the designation Natsyn ® 2200. Eighty parts by weight of polyisoprene was used in each sample.

The rubber was added to a laboratory Brabender with a microprocessor controller. During mixing and heating, the copolyester was added followed by introduction of the polyepoxide. Typical temperatures were 150° C. and the usual mixing time was 7 minutes.

EXAMPLE 2

Each of the three alloys prepared in Example 1 containing the copolyester, polyepoxide and polyisoprene were compounded in with conventional rubber additives. The control used 100 parts of polyisoprene commercially available from The Goodyear Tire & Rubber Company under the designation Natsyn ® 2200. Samples 2-4 used 100 parts of the respective alloy of copolyester, polyepoxide, and polyisoprene and 20 phr of polyisoprene. Each stock contained the same conventional amounts of carbon black, processing oil, antiozonant, waxes, stearic acid, peptizer, antioxidant, zinc oxide, accelerators and sulfur. The alloy was added during the nonproductive stage of mixing. Table I below provides the physical data for the control and for the three samples. Each of the alloys produced a significant increase in tensile modulus values with Alloy 3 in Example 4 providing the best tensile at break value.

TABLE I

|  | Control Sample 1 | Sample 2 | Sample 3 | Sample 4 |
|---|---|---|---|---|
| Polyisoprene | 100 | 20 | 20 | 20 |
| Alloy 1 |  | 100 |  |  |
| Alloy 2 |  |  | 100 |  |
| Alloy 3 |  |  |  | 100 |
| Rheometer 150° C. | | | | |
| T2 (min.) | 4.5 | 5.0 | 6.0 | 6.5 |
| T25 (min.) | 5.6 | 6.3 | 7.0 | 7.6 |
| T90 (min.) | 10.0 | 11.6 | 13 | 13.5 |
| Max. Torque (dN · m) | 38 | 41 | 39 | 38 |
| Min. Torque (dN · m) | 7 | 7 | 7 | 7.5 |
| Δ Torque (dN · m) | 31 | 34 | 32 | 31 |
| Instron | | | | |
| 50% Modulus (MPa) | 1.18 | 2.26 | 2.87 | 2.44 |
| 100% Modulus (MPa) | 1.84 | 3.94 | 3.69 | 4.37 |
| 200% Modulus (MPa) | 3.92 | 7.57 | 5.33 | 9.16 |
| 300% Modulus (MPa) | 7.93 | 12.18 | 8.47 | — |
| Ultimate Tensile (MPa) | 28.41 | 13.63 | 13.76 | 13.32 |
| % Elongation | 690 | 315 | 465 | 264 |

Alloy 1 Copolyester/DEN 438/Polyisoprene (80 phr polyisoprene)
Alloy 2 Copolyester/DER 331/Polyisoprene (80 phr polyisoprene)
Alloy 3 Copolyester/PT 810/Polyisoprene (80 phr polyisoprene)

EXAMPLE 3

The procedures of Example 1 were repeated to produce three alloys except an equivalent amount of natural rubber was substituted for the synthetic polyisoprene.

EXAMPLE 4

The procedures of Example 2 were repeated except the three alloys prepared in Example 3 containing the copolyester, polyepoxide and natural rubber were compounded. The control used 100 parts of natural rubber. Samples 2-4 used 100 parts of the respective alloy of copolyester, polyepoxide and natural rubber and 20 parts of natural rubber. Each stock contained the same amount of each rubber additive used in Example 2. Table II below provides the physical data for the control and for the three samples. The addition of alloy to natural rubber also produces a significant increase in tensile modulus values. The alloy produced with PT810 (Sample 4) gave the largest increase in modulus values.

TABLE II

|  | Control Sample 1 | Sample 2 | Sample 3 | Sample 4 |
|---|---|---|---|---|
| Polyisoprene | 100 | | | |
| Alloy 1 | | 100 | | |
| Alloy 2 | | | 100 | |
| Alloy 3 | | | | 100 |
| Rheometer 150° C. | | | | |
| T2 (min.) | 5.2 | 5.5 | 5.0 | 3.5 |
| T25 (min.) | 6.2 | 6.8 | 6.5 | 4.5 |
| T90 (min.) | 11.2 | 11.4 | 11.6 | 10 |
| Max. | 36 | 34 | 32 | 42 |
| Min. | 10 | 11 | 9 | 9 |
| Δ T | 26 | 23 | 23 | 33 |
| Instron | | | | |
| 50% Modulus | 1.18 | 2.26 | 2.87 | 2.44 |
| 100% Modulus | 1.84 | 3.94 | 3.69 | 4.37 |
| 200% Modulus | 3.92 | 7.57 | 5.33 | 9.16 |
| 300% Modulus | 7.93 | 12.18 | 8.47 | — |
| Ultimate Tensile | 28.41 | 13.63 | 13.76 | 13.32 |
| % Elongation | 690 | 315 | 465 | 264 |

Alloy 1 Copolyester/DEN 438/Natural Rubber (80 parts natural rubber)
Alloy 2 Copolyester/DER 331/Natural Rubber (80 parts natural rubber)
Alloy 3 Copolyester/PT 810/Natural Rubber (80 parts natural rubber)

EXAMPLE 5

A copolyester resin was prepared based initially charging 0.179 moles of dimethyl terephthalate, 0.0177 moles of dimethyl isophthalate, 0.1578 moles of dimethyl naphthalate and 0.7556 moles of ethylene glycol to a reactor. Manganese acetate (0.035 grams) catalyst was used. The five items were heated to 180° C. until 21.5 ml of methanol was collected. 0.035 grams of $Sb_2O_3$ was added and the temperature was raised to 250° C. 20.5 ml of ethylene glycol was collected. Vacuum was initiated and the temperature was raised to 270° C. After two hours the reactor was pressurized to atmospheric pressure. 0.012 moles of isophthalic acid was added. After one-half hour, the product was collected. The copolyester had an IV of 0.205 and an acid number of 24.92. The polyepoxide used was PT810 and the unvulcanized rubber was natural rubber. The alloy was produced in a Berstorff twin screw extruder at a reaction temperature of 170° C. 25 parts by weight of the copolyester, 1.8 parts by weight of the PT810, 100 parts by weight of the natural rubber, and 0.125 parts by weight of benzyl trimethyl ammonium chloride were simultaneously added to the extruder. The kneaders had a 8.75 L/D and the gears had a 5.25 L/D.

EXAMPLE 6

The alloy of Example 5 was compounded in the rubber stock below. Table III below lists the data from the physical testing of the control versus using 25 parts and 37.5 parts of the polymer alloy of Example 5. Conventional amounts of fillers, processing aids, antioxidants and curatives were used in each compound at the same level of addition. The only variations in composition are shown in Table III.

TABLE III

|  | Control Sample 1 | Sample 2 | Sample 3 |
|---|---|---|---|
| Natural Rubber* | 52.50 | 32.50 | 22.50 |
| Natural Rubber** | 0 | 20.00 | 30.00 |
| Alloy Added | 0 | 25.00 | 37.50 |

TABLE III-continued

|  | Control Sample 1 | Sample 2 | Sample 3 |
|---|---|---|---|
| Copolyester | 0 | 5.00 | 7.50 |
| Rheometer 150° C. | | | |
| Max. (DN · M) | 15.200 | 15.500 | 15.700 |
| Min. (DN · M) | 1.900 | 2.000 | 1.900 |
| Delta Torque (DN · M) | 13.300 | 13.500 | 13.800 |
| Final Torque (DN · M) | 15.200 | 15.500 | 15.700 |
| Time 1 Pt. Rise (Min.) | 7.300 | 7.700 | 6.600 |
| T25 (Min.) | 8.400 | 8.900 | 7.800 |
| T90 (Min.) | 17.700 | 19.100 | 18.300 |
| 300% Modulus (MPa) | 7.900 | 7.600 | 7.800 |
| Tensile Strength (MPa) | 11.900 | 10.700 | 10.500 |
| Elongation at Break (%) | 444.000 | 429.000 | 417.000 |
| RT Hardness | 55.200 | 60.400 | 61.300 |
| 100° C. Hardness | 51.200 | 53.800 | 54.600 |
| RT Rebound (%) | 57.100 | 53.700 | 53.200 |
| 100° C. Rebound (%) | 68.100 | 61.900 | 61.600 |
| Spec. Grav. (G/CM3) | 1.108 | 1.118 | 1.123 |
| Cord Adhesion, N | | | |
| Polyester | 133 | 162 | 173 |
| Nylon | 89 | 104 | 118 |

*Natural rubber added separately in the Banbury.
**Natural rubber contained in alloy.

What is claimed is:

1. A composition which comprises the reaction product of a mixture of:
    (a) from 10 to 30 parts by weight of a polyester resin produced from the precondensation reaction of a diol, a dicarboxylic compound, and a chain branching agent said polyester subsequently condensed and having an intrinsic viscosity from about 0.13 to about 0.35 dl/g, a glass transition temperature of at least 50° C. and an acid number from about 5 to 50; said dicarboxylic compound selected from the group consisting of dicarboxylic acids and dicarboxylic esters, said dicarboxylic acids selected from the group consisting of alkyl dicarboxylic acids having a total of from 2 to 16 carbon atoms, and aryl dicarboxylic acids having a total of from 8 to 16 carbon atoms, said dicarboxylic esters selected from the group consisting of alkyl diesters having from 2 to 20 carbon atoms and alkyl substituted aryl diesters having from 10 to 20 carbon atoms and
    said diol in a concentration from about 115 to 220 mole percent of the concentration of said dicarboxylic compound and selected from the group consisting of diols having from 2 to 10 carbon atoms,
    said chain branching agent in a concentration of from about 2 mole percent to about 8 mole percent of the concentration of said dicarboxylic compound and selected from the group consisting of trimellitic anhydride, pentaerythritol, glycerol, trimethylol propane, triethylol propane, and combinations thereof,
    (b) from 1 to 6 parts by weight of at least one polyepoxide having at least two epoxy groups per molecule; and
    (c) from 50 to 150 parts by weight of an unvulcanized rubber.

2. The composition of claim 1 wherein said polyepoxide is a polyepoxide polyether.

3. The composition of claim 1 wherein said unvulcanized rubber is selected from the group consisting of polybutadiene, styrene-butadiene rubber, synthetic polyisoprene, natural rubber, isoprene-butadiene rubber, isoprene-butadiene-styrene rubber, nitrile rubber, carboxylated nitrile rubber and EPDM.

4. The composition of claim 1 comprising
   (a) from 15 to 25 parts by weight of said polyester resin;
   (b) from 1 to 5 parts by weight of said polyepoxide; and
   (c) from 75 to 125 parts by weight of said unvulcanized rubber.

5. A pneumatic tire comprising a component containing the composition of claim 1 wherein the component is selected from the group consisting of a tread base, tread cap, carcass ply, cushion, belt ply, shoulder wedge, bead area, apex and chafer.

6. The pneumatic tire of claim 5 wherein the component is a carcass ply.

7. A rubber stock comprising a blend of
   (a) a polymer alloy which is the reaction product of a mixture of
      (1) from 10 to 30 parts by weight of a polyester resin produced from the polycondensation reaction of a diol, a dicarboxylic compound and a chain branching agent, said polyester subsequently condensed and having an intrinsic viscosity from about 0.13 to about 0.35 dl/g, a glass transition temperature of at least 50° C. and an acid number from about 5 to 50; said dicarboxylic compound selected from the group consisting of dicarboxylic acids and dicarboxylic esters, said dicarboxylic acids selected from the group consisting of alkyl dicarboxylic acids having a total of from 2 to 16 carbon atoms, and aryl dicarboxylic acids having a total of from 8 to 16 carbon atoms, said dicarboxylic esters selected from the group consisting of alkyl diesters having from 2 to 20 carbon atoms and alkyl substituted aryl diesters having from 10 to 20 carbon atoms and
      a diol in a concentration from about 115 to 220 mole percent of the concentration of said dicarboxylic compound and selected from the group consisting of diols having from 2 to 10 carbon atoms,
      said chain branching agent in a concentration of from about 2 mole percent to about 8 mole percent of the concentration of said dicarboxylic compound and selected from the group consisting of trimellitic anhydride, pentaerythritol, glycerol, trimethylol propane, triethylol propane and combinations thereof,
      (2) from 1 to 6 parts by weight of at least one polyepoxide having at least two epoxy groups per molecule; and
      (3) from 50 to 150 parts by weight of an unvulcanized rubber; and
   (b) an unvulcanized rubber selected from the group consisting of natural rubber and synthetic rubber derived from a diene monomer
   wherein the amount of polymer alloy is present in the blend in an amount that the total weight of the polyester and polyepoxide ranges from about 2 to 25 parts by weight per 100 parts by weight of the total unvulcanized rubber in the stock.

8. The rubber stock of claim 7 wherein the amount of polymer alloy is present in the blend in an amount that the total weight of polyester and polyepoxide ranges from about 5 to 15 parts by weight based on 100 parts by weight of the total rubber in the stock.

9. The rubber stock of claim 7 wherein said polyepoxide is a polyepoxide polyether.

10. The rubber stock of claim 7 wherein said unvulcanized rubber is selected from the group consisting of polybutadiene, styrene-butadiene rubber, synthetic polyisoprene, natural rubber, isoprene-butadiene rubber, isoprene-butadiene-styrene rubber, nitrile rubber, carboxylated nitrile rubber and EPDM.

11. The rubber stock of claim 7 wherein said unvulcanized rubber in the alloy is the same type of rubber to which the alloy is combined to form the blend.

* * * * *